US 6,695,206 B2

(12) United States Patent
Ross

(10) Patent No.: US 6,695,206 B2
(45) Date of Patent: Feb. 24, 2004

(54) IDENTIFICATION SYSTEM DISPLAYING A USER IMAGE AT A REMOTE LOCATION

(75) Inventor: William Leslie Ross, London (GB)

(73) Assignee: Personal Biometric Encoders Ltd., London (GB)

(*) Notice: Subject to any disclaimer, the term of this patent is extended or adjusted under 35 U.S.C. 154(b) by 0 days.

(21) Appl. No.: 10/298,757

(22) Filed: Nov. 18, 2002

(65) Prior Publication Data

US 2003/0066882 A1 Apr. 10, 2003

Related U.S. Application Data

(63) Continuation of application No. 09/834,356, filed on Apr. 13, 2001, now abandoned, which is a continuation of application No. 09/101,148, filed as application No. PCT/GB97/00064 on Jan. 9, 1997, now abandoned.

(30) Foreign Application Priority Data

Jan. 9, 1996 (GB) .......................................... 96 00 359

(51) Int. Cl.[7] .............................................. G06K 5/00
(52) U.S. Cl. ........................ 235/380; 235/382; 382/116; 382/118; 382/124; 340/5.53; 340/5.83; 379/93.03; 705/18
(58) Field of Search ................................. 235/375, 380, 235/382, 441, 492; 382/115, 118, 124, 116; 340/5.1, 5.52, 5.53, 5.6, 5.82, 5.83; 379/93.03, 93.23, 142; 713/186; 705/18, 44

(56) References Cited

U.S. PATENT DOCUMENTS

| 4,582,985 A | * | 4/1986 | Lofberg ........................ 235/380 |
| 4,879,747 A | | 11/1989 | Leighton et al. ............... 380/23 |
| 4,993,068 A | * | 2/1991 | Piosenka et al. ............. 713/186 |
| 4,995,081 A | | 2/1991 | Leighton et al. ............... 380/23 |
| 5,131,038 A | | 7/1992 | Puhl et al. ....................... 380/23 |
| 5,436,970 A | * | 7/1995 | Ray et al. ...................... 713/186 |
| 5,469,506 A | | 11/1995 | Berson et al. .................. 380/23 |
| 5,559,504 A | * | 9/1996 | Itsumi et al. ............ 382/115 X |
| 5,623,552 A | * | 4/1997 | Lane ........................... 382/124 |
| 5,754,675 A | * | 5/1998 | Valadier ....................... 382/115 |
| 5,761,279 A | * | 6/1998 | Bierman et al. .......... 379/93.23 |
| 5,875,239 A | * | 2/1999 | Koralewski et al. ........ 379/142 |
| 6,104,809 A | * | 8/2000 | Berson et al. ............... 713/186 |
| 6,325,285 B1 | * | 12/2001 | Baratelli ...................... 235/380 |
| 6,547,130 B1 | * | 4/2003 | Shen ........................... 235/380 |

FOREIGN PATENT DOCUMENTS

| EP | 0 101 772 | 3/1984 | |
| EP | 0 379 333 | 7/1990 | ...................... 7/10 |
| EP | 0 459 808 | 12/1991 | ..................... 11/12 |
| FR | 2 642 882 | 8/1990 | ........................ 5/4 |
| GB | 2 174 831 | 11/1986 | ....................... 9/60 |
| GB | 2 243 235 | 10/1991 | ....................... 9/20 |
| JP | 3-154467 A | * 7/1991 | |
| JP | 4-352547 | 12/1992 | ........................ 1/66 |
| JP | 4-352548 | 12/1992 | ........................ 1/66 |
| JP | 5-063844 | 3/1993 | |
| JP | 7-050665 | 8/1993 | ....................... 9/32 |
| JP | 6-268998 | 9/1994 | ....................... 7/14 |
| JP | 8-097903 | 7/1995 | ........................ 1/66 |
| WO | WO 82/03286 | 9/1982 | |
| WO | WO 86/06527 | 11/1986 | |
| WO | WO 94/25938 | 11/1994 | |

* cited by examiner

Primary Examiner—Jared J Fureman
(74) Attorney, Agent, or Firm—Greenberg Traurig, P.C.

(57) ABSTRACT

A method for remote verification in which a first party at a first telephone confirms their identity to a second person at a second telephone. The fingerprint of the first person is read and compared to a stored fingerprint pattern. If the stored and sensor fingerprint patterns match, the first telephone transmits a signal to the second telephone which controls a display on the second telephone to display an image of the first person.

6 Claims, 6 Drawing Sheets

IDENTIFICATION SYSTEM DISPLAYING A USER IMAGE AT A REMOTE LOCATION

This application is a continuation of application Ser. No. 09/834,356, filed Apr. 13, 2001, now abandoned, which is a continuation of application Ser. No. 09/101,148, filed Oct. 28, 1998, now abandoned, which is a 371 of PCT/GB97/00064, filed Jan. 9, 1997. This invention relates to an identification system for verifying the identity of a person.

BACKGROUND OF THE INVENTION

It is often necessary to confirm that someone instructing a transaction is who they claim to be or that they are authorised to carry out a particular transaction. Identification cards carrying a photograph of authorised personnel are well known as are cards, e.g. bank cards, having a magnetic strip containing details of a four digit code which can be compared to a code inputted by the carrier of a card into a card receiving machine.

Identification cards of the first type having a photograph on their surface which is always visible may be tampered with. For example, the photograph may be removed and replaced with another. Furthermore, such cards cannot be used for a remote identification as they cannot be used to generate an identification signal which may be transmitted to a location remote from the card carrier and the card. This means that the card is not suitable for identification of someone authorising the transaction over, for example, the telephone.

The magnetic strip type of identification card results in a 'yes' or a 'no' signal. The strip merely stores a code corresponding to the authorised card user's input code and does not produce an identification signal which can be transmitted to a remote display to generate a display characteristic of the carrier of the card and readily identifiable therewith.

SUMMARY OF TEE INVENTION

The invention is defined in claims 1, 2, or 6 to which reference should now be made.

Embodiments of the invention of claims 1, 2, or 6 allow one to generate a signal which can be transmitted to a remote display to produce a display readily identifiable with a particular user by someone monitoring the display.

Preferably, the second memory of claim 2 stores a bit map corresponding to an image of, the face of the carrier of the card which is transmitted to a remote display to generate an image of the carrier of the card. This results in an identification signal which is difficult to replicate by a forger and yet which can be easily generated and transmitted by the user of the card.

Preferred features of the invention are described in is the claims appendant on claims 1, 2, and 6 to which reference should now be made.

BRIEF DESCRIPTION OF THE DRAWINGS

An embodiment of the invention will now be described, by way of example, with reference to the accompanying figures in which.

DETAILED DESCRIPTION OF THE DRAWINGS

Figure 1:
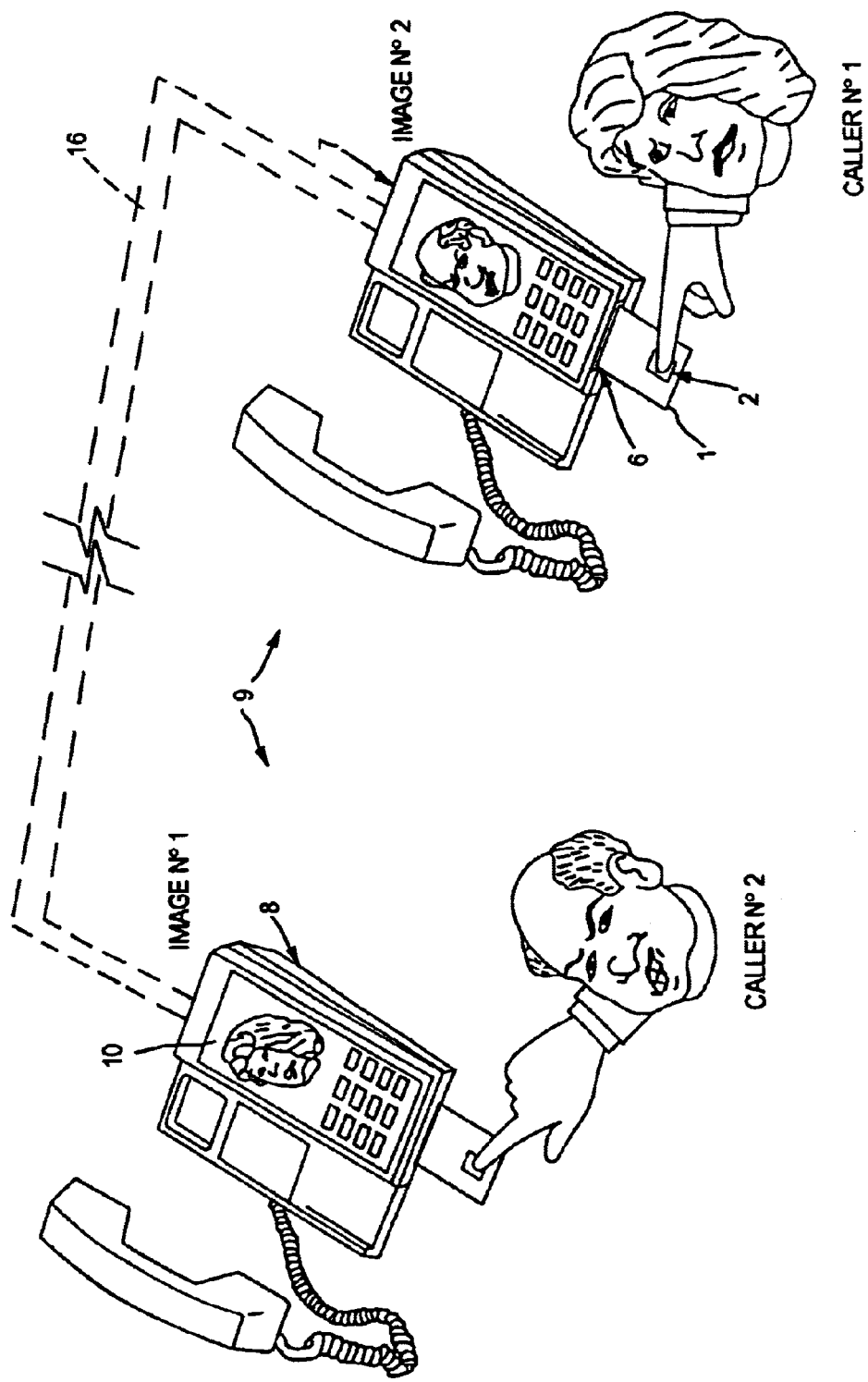
FIG. 1 illustrates (not to scale) a remote identification system.
Figure 2:
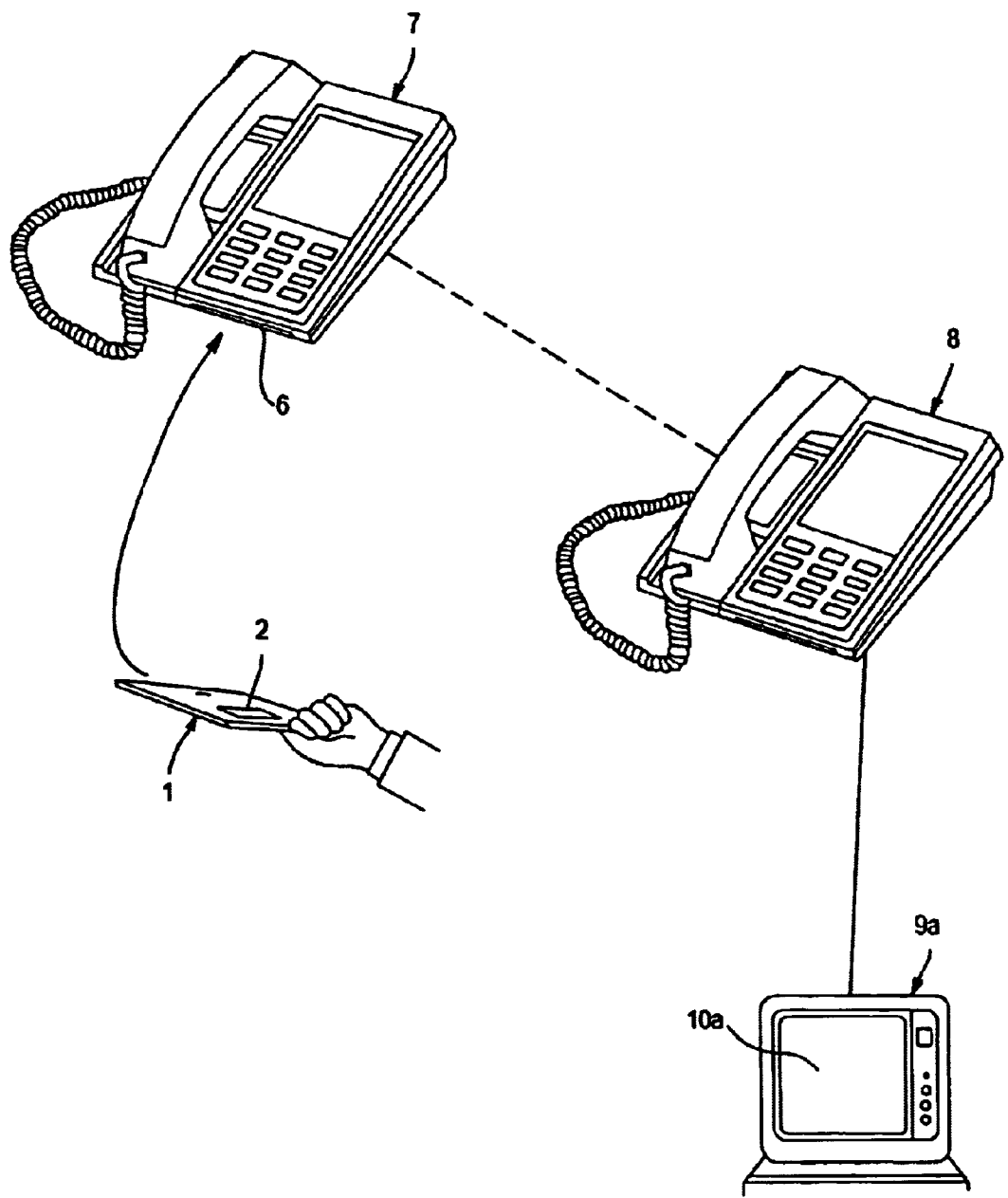
FIG. 2 illustrates (not to scale) an alternative embodiment of the system.

FIG. 1 illustrates a remote identification system for verifying the identity of a card carrier at a location remote from an operator processing a transaction. The embodiment is particularly suitable, e.g., for verifying the identify of the person giving telephone instructions for banking, stock broking, or dealing transactions.

A card 1, for example a PCMCIA (i.e. card approved by Personal Computer Memory Card International Association) card, has an in-built fingerprint sensor 2 and on-card memory 3 and data processing means 4. The card, data processing and fingerprint sensor construction may be as described in International Patent Application No. WO94/25938, European Patent Application No.EP0459808 or UK Patent Application No. GB2243235.

A card reader having a card receiving slot 6 is incorporated in a first telephone 7, for use for example, by a first person for instructing a second person to carry out a transaction. A second telephone 8 in communication with the first telephone 7 for use for example by a second person being instructed to carry out the transaction incorporates a display system 9 and/or is connected to an external display system 9a.

When the card carrier (caller No. 1) using the first telephone 7 to instruct a transaction wishes to identify himself, he inserts the card 1 in the slot 6 and presses down on the fingerprint sensor 2 with the tip of one of his fingers. As described in more detail below, the sensed fingerprint pattern is compared with a stored fingerprint pattern corresponding to the authorised carrier of the card. This stored pattern is held in an on-card memory 3.

The sensing and comparison of fingerprint patterns may be as described in EP0459808, GB2243235 and WO94/25938.

If the sensed and stored fingerprint patterns correspond, a signal representing an image of the face of the authorised card carrier is transmitted down the telephone line 16 connecting the two telephones to the second telephone 8. The identification display system 9 or 9a includes a screen or visual display unit 10 or 10a and data processing means 11. The data processing means 11 receives the transmitted image signal and causes the image of the authorised card carrier represented by the image signal to be displayed on the screen 10 (Image No. 1).

Alternative embodiments of the invention may alternatively include the transmission and output respectively of either any image signal and image characteristic of the first person or a group to which the first person belongs, or of an audio signal and noise characteristic of the first person or a group to which the first person belongs.

Figure 3:
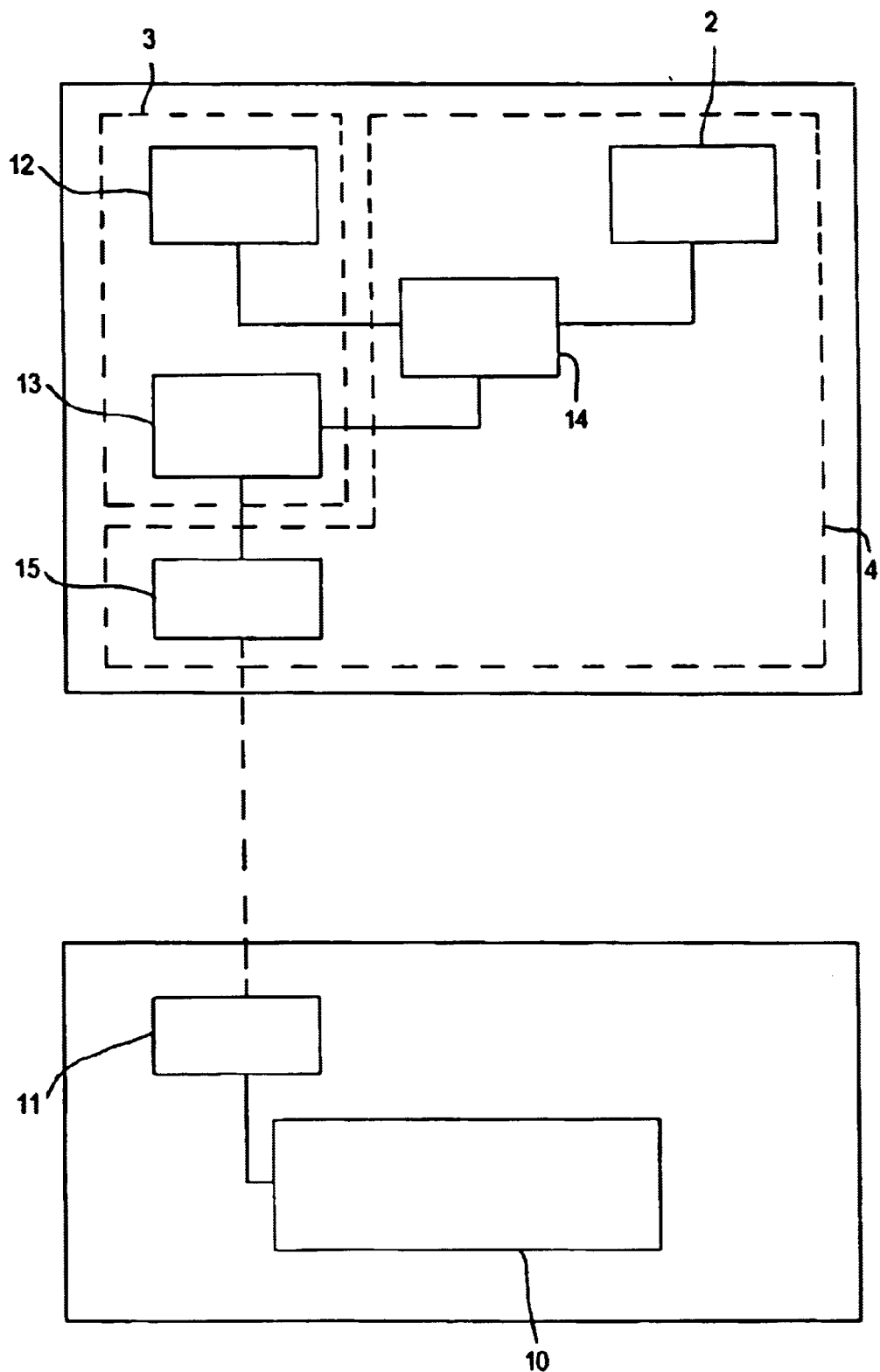
FIG. 3 is a block diagram of the flow of information corresponding to the system in FIG. 1 or 2.

Referring to FIG. 3, the on-card memory means 3 includes a first memory 12 for storing a signal representing the finger print pattern of the authorised carrier of the card, and a second memory 13 storing in digital form, i.e. as a bit map, an image of the face of the authorised carrier of the card. The on-card data processing means 4 includes a comparison means 14 for comparing the fingerprint pattern signal generated by the fingerprint sensor 2 and its associated data processing circuitry, with the stored signal in the first memory 12. A comparison means 14 generates a coincidence signal when the stored and generated signals match.

The coincidence signal is then used to address the second memory 13 and an image signal is transmitted by the image signal generating means 15 via a telephone connection 16 (either a radio or fixed line) to the second telephone 8. The second telephone set 8 is connected to data processing circuitry 11 which converts the image signal supplied by the on-card memory and associated data processing circuitry to the first telephone and thence to the second telephone 7, from the bit map stored in the second memory 13 into a visual display of the image of the, say, face of the authorised carrier of the card for display on a screen 10 (see FIG. 6).

As shown in FIG. 1, the two telephones 7 and 8 may be of similar construction so that each participant in a telephone conversation can verify the identity of the other participant.

Figure 4:
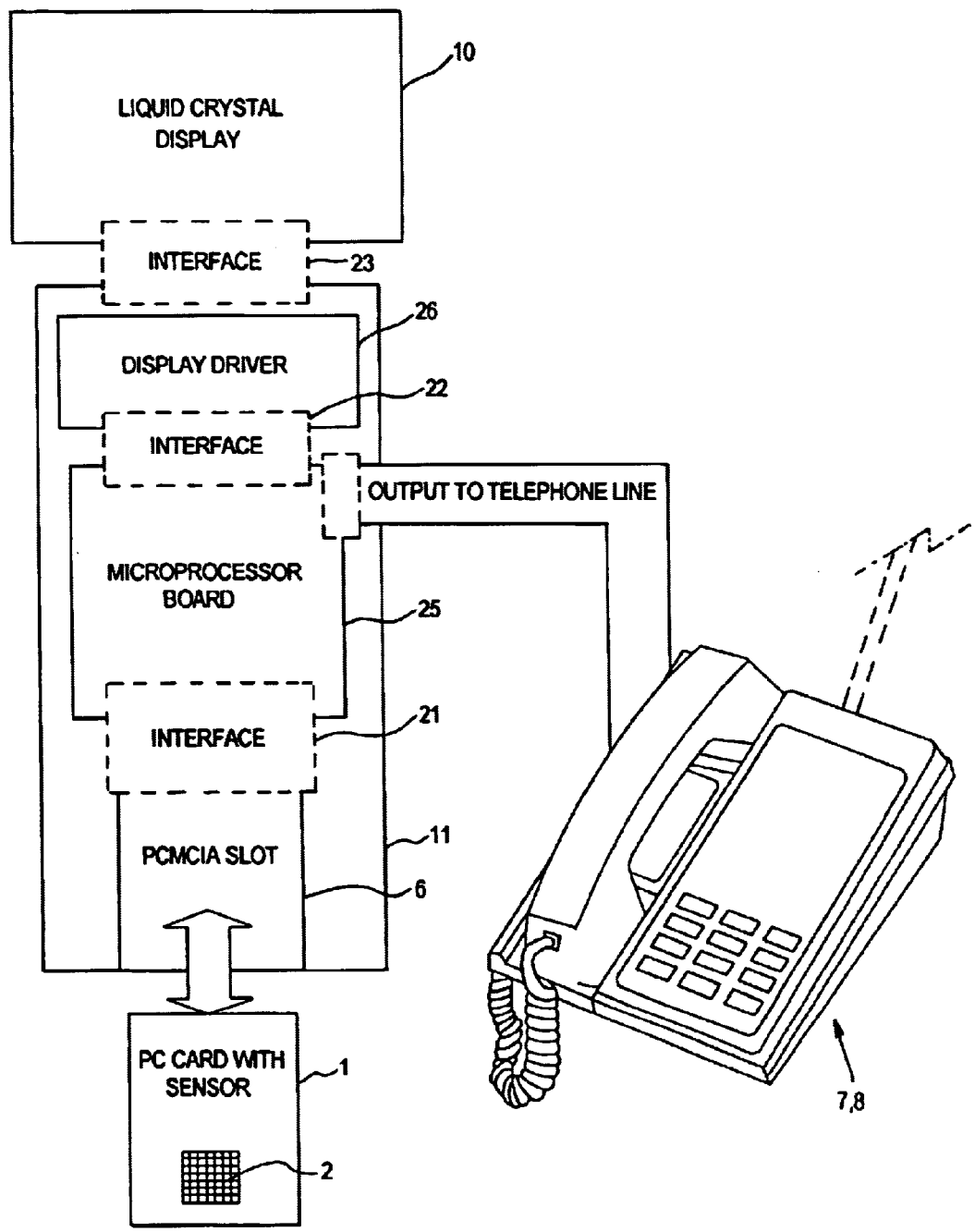
FIG. 4 is a schematic illustration of the construction of a terminal for use in the remote identification system of FIGS. 1 to 3.

Referring to FIG. 4, the telephone 7, 8 includes a microprocessor board 25 which communicates via a telephone line with another telephone 8, 7.

This microprocessor 25 includes a first interface element 21 through which an image signal generated by a card 1 is supplied to the microprocessor 25 and thence to a remote telephone.

The microprocessor 25 also includes a second interface element 22 through which an image signal received by the telephone from a remote telephone is supplied to a display driver 26. The display driver 26 controls a liquid crystal display 10 to display the image represented by the image signal received from the remote telephone in communication with the microprocessor 25.

The remote identification or verification system described in which a portable data processing device such as a PCMCIA or PC (Personal Computer) card including a built-in fingerprint sensor, data processing capacity and memory generates a signal representative of a human recognisable characteristic feature of a person or group of persons in response to the sensing of a pre-determined fingerprint pattern allows remote verification using standard communications apparatus such as telephones.

The PCMCIA, PC or similar card (i.e. a card having a large memory, for example greater than 5 megabytes, and data processing capacity) can sense a fingerprint and carry out all the data processing necessary to produce a signal representative if, say, an image in a form suitable for transmission by a standard telephone or modem.

Data processing cards having an in-built sensor (for example, of the type described in WO94/25938) are relatively inexpensive to produce. This combined with the small amount of modification required to allow a first telephone to receive the signal produced by the card and a second telephone to produce an output from this signal means that the described remote verification system is inexpensive. This system therefore allows for secure remote verification without the need for expensive dedicated equipment. This is particularly true if the data processing card also includes, for example, personal information such as driving licence, passport, social security or banking details and is in common circulation. In this scenario, the data processing card already in operation as an identity card could be inexpensively programmed to include the information and software necessary to implement the verification system described above.

The described fingerprint pattern comparison between stored and sensed fingerprint pattern may be supplemented by an additional biometric check. A biometric is used herein to describe a substantially stable characteristic of a person which can be automatically measured and characterised for comparison. Suitable biometrics for supplementing a fingerprint pattern include palm prints, retinal prints, as well as facial, behavioural or linguistic characteristics. Behavioural-characteristics may include the manner in which a person writes his signature and linguistic characteristics may include voice patterns.

A supplementary biometric may be picked up by an auxiliary data capture device (or if linguistic, the telephone) and compared with data stored on the data processing card. The use of a second supplementary biometric or any other supplementary verification (e.g. password) increases the security of the system.

Apparatus for capturing a fingerprint pattern and image for storing on a card 1 for use in the method and apparatus described above will now be described with reference to FIGS. 5 and 6.

Figure 5:
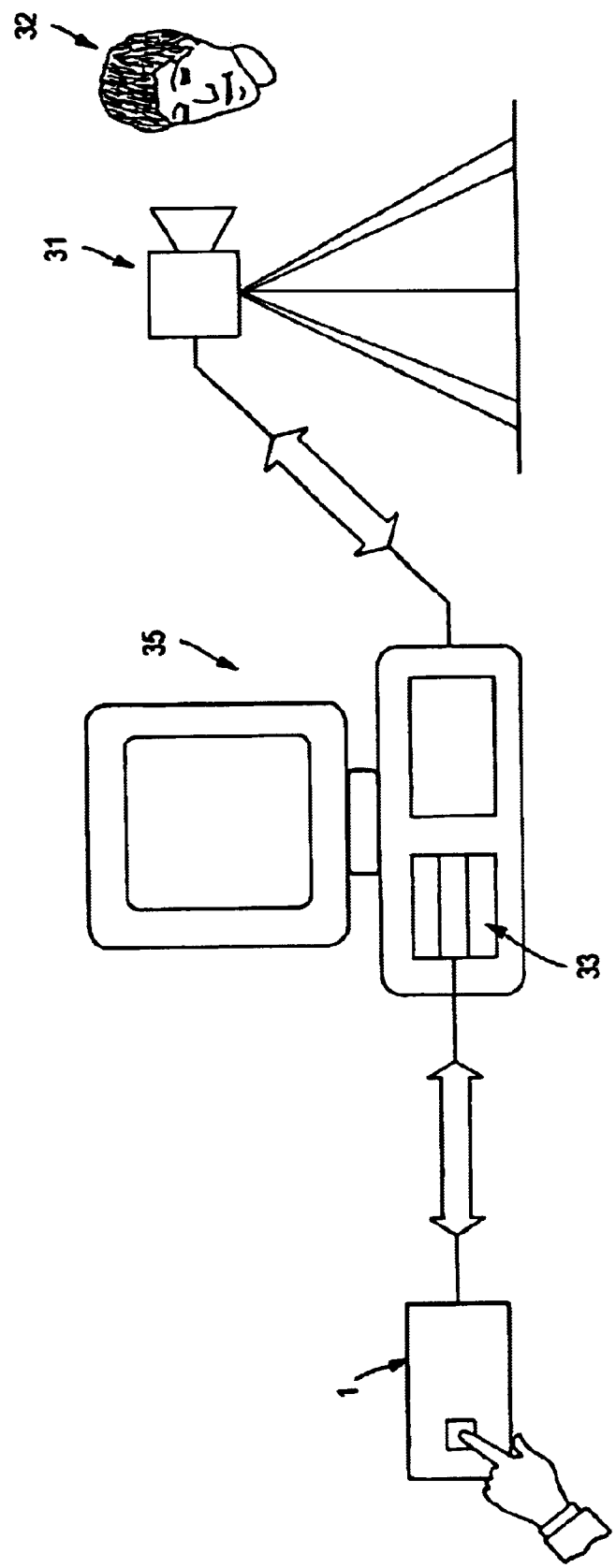
FIG. 5 illustrates apparatus for storing signals representative of a fingerprint pattern and an image or a data processing card.
Figure 6:
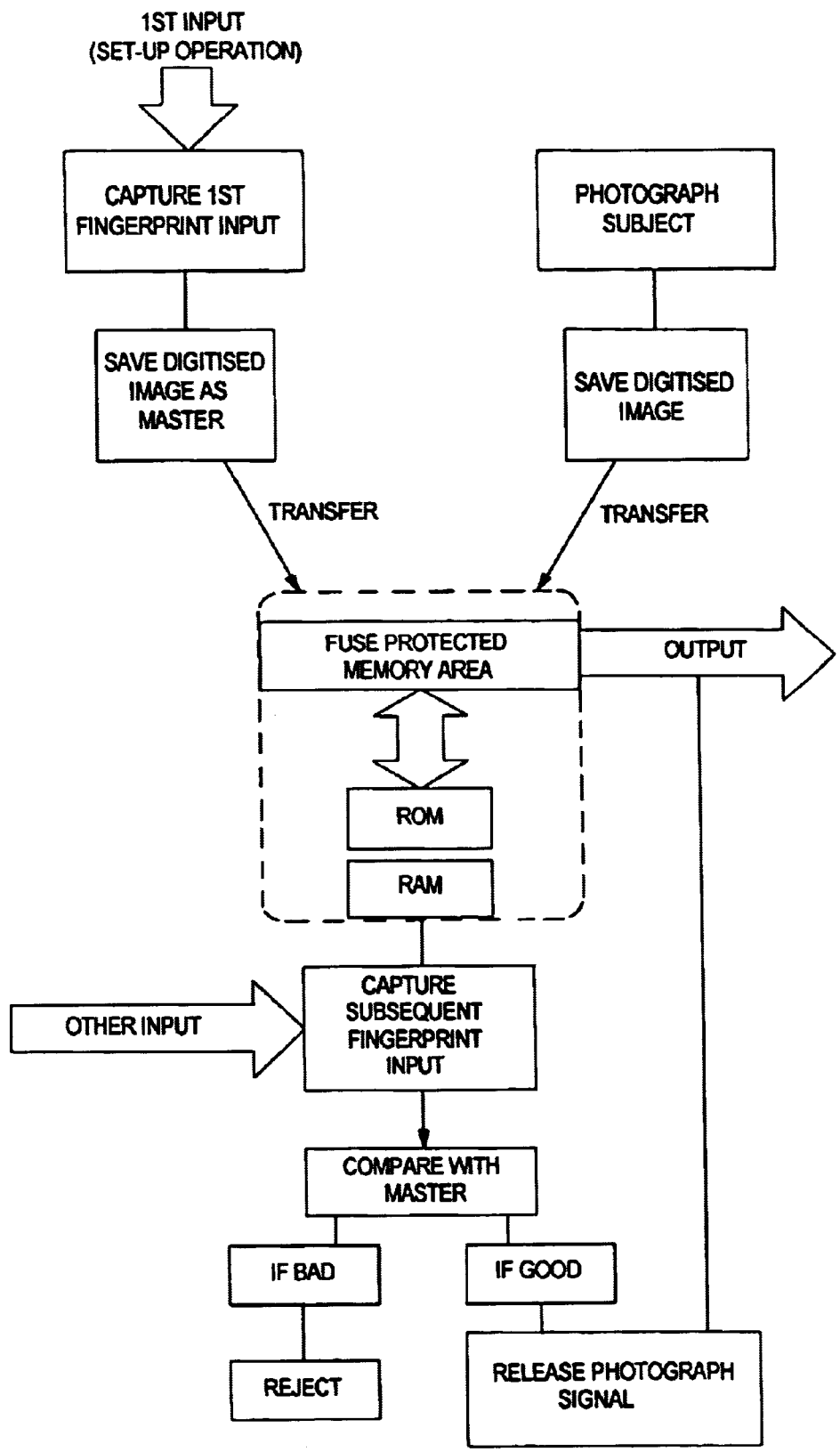
FIG. 6 is a block diagram of the flow of information corresponding to the system embodied by the apparatus of FIGS. 1 or 2 and 5.

Referring to FIGS. 5 and 6, a camera 31 is used to capture and record an image such as the face 32 of the person for whom the card 1 is being set up. The image recorded by the camera 1 is digitised (i.e. converted into a bit map signal). The operation of digitising of an optical image is well known and a number of known techniques and appropriate systems are suitable as is apparent to the man of ordinary skill.

A card 1 having an in-built sensor 2 is inserted into a slot 33 of, for example, a personal computer 35. The slot includes connectors allowing data to flow between the on-card memory and data processing elements and the personal computer 35. The personal computer is also connected to the camera 31 allowing the digitised image signal produced by the camera 31 to be supplied to the personal computer 35. In an alternative embodiment the camera produces an analogue signal which is subsequently digitised by the personal computer 35.

The personal computer 35 includes a set-up program which takes the image signal supplied by the camera and, causes this to be stored in a protected memory area (the second memory 13) of the on-card memory for subsequent access and processing as described in the identification or verification method described above.

Referring to FIGS. 5 and 6, the personal computer 35, card 1 and fingerprint sensor 2 are used to set up the card 1 such that the fingerprint pattern of the person to whom the card is issued is stored in a first memory 12 of a fuse protected memory area of the card. The process of setting up the card is described in WO94/25938 and essentially involves the capture and storing of the first fingerprint pattern sensed by a newly issued card.

In an alternative embodiment of the system, the card 1 is programmed to contain the software necessary for the first sensed fingerprint pattern after issuing of the card to be stored on the card. In this alternative embodiment, a personal computer 35 or data processing external to the card are not required to set up the card with a stored fingerprint pattern. Such a card would be set up as is presently done with newly issued credit cards; on receipt of a card having no stored fingerprint pattern the user presses his or her fingerprint against the sensor 2 on the card. The on-card data processing then stores a signal representative of this pattern in a pre-treated memory area of the card.

As can be seen from the above description of the set-up operation for programming a card 1, and the verification method using a card programmed with the fingerprint pattern and image of the authorised user of the card, embodiments of the present invention result in a simple inexpensive system for both producing secure identification or verification cards, and reading (i.e. using) such cards.

A preferred embodiment of the invention would include a data processing element in the telephone 7, 8, which records any attempt (whether successful or unsuccessful) to authorise a transaction, as well as details of the person requesting the transaction. Such details may be stored in the on-card memory and transmitted through the telephone connection subsequent, simultaneously or prior to the image signal. The recorded details may include the image stored on the card. This has clear benefits in tracking, recording or identifying those seeking to instruct or make unauthorised transactions.

Although no described in detail, it can be appreciated by those with ordinary skill in the art that the method and system of the present invention can be readily implemented with pre-existing or known hardware and software. In the preferred embodiments described in the data processing card and personal computer include data processing elements and associated memory elements for storing operating programs and application programs for carrying out the method steps described. Furthermore, one or more of the method steps (e.g. the set-up and data capture operations) can be implemented in either gate array logic elements or software.

It will be appreciated that although described embodiments of the invention use a small portable data processing device such as a PCMCIA card, the system can be implemented using any form of portable data processing device such as a lap-top, palm to palm or desk top computer or indeed any (i.e. non-portable) data processing device connected or couple to a fingerprint sensor and having sufficient memory and data processing capacity to carry out the necessary operations.

What is claimed is:

1. An identification method for remote identity verification including the steps of:
   at a first location, generating a signal representing a fingerprint pattern, after a line of communication to a second location remote from the first location has been opened;
   at the first location comparing the generated signal to a fingerprint signal, stored at the first location, generating a coincidence signal when the stored and generated fingerprint signals match;
   at the first location, using the coincidence signal to address a memory storing a facial image signal representing an image of a face of a pre-determined person;
   transmitting the facial image signal along the already open line of communication to the second location remote from the first location where the fingerprint pattern is sensed; and
   generating a display of the stored facial image at the second remote location.

2. An identification system for remote identity verification including:
   at a first location, fingerprint sensing means for sensing a fingerprint pattern;
   at the first location, data processing means for producing a signal representing a sensed fingerprint pattern;
   at the first location, a first memory, for storing a signal representing a selected fingerprint pattern of a pre-determined person;
   at the first location signal comparison means for comparing a signal generated by the data processing means from a sensed fingerprint pattern with the stored fingerprint pattern and generating a coincidence signal when the generated signal matches the stored fingerprint pattern;
   at the first location, second memory for storing a facial image signal representing an image of a face of the pre-determined person;
   at the first location, addressing means for retrieving the facial image signal from the second memory when a coincidence signal is generated by the comparison means; and
   at a second location, display means connected to and remote from the addressing means, converting the facial image signal into a display of the stored facial image.

3. An identification system according to claim 2 wherein the fingerprint sensing means, data processing means, first memory, signal comparison means, second memory and addressing means are on a card.

4. An identification system according to claim 2 wherein the display means is connected to the addressing means via respective first and second communications terminals.

5. An identification system according to claim 4 wherein the first and second communications terminals are telephones.

6. A method for validating a transaction card comprising the steps of:
   forming a digital image of a pre-determined authorized person or card user on a transaction card;
   storing a signal representing a fingerprint pattern of the pre-determined authorized person or card user;
   sensing a fingerprint pattern of a card user and generating a signal representing the sensed fingerprint pattern;
   determining if a match exists between the stored fingerprint pattern signal and the generated fingerprint pattern signal;
   sending the digital image to a location remote from a point of transaction;
   displaying the digital image of the location remote from the point of transaction; and
   validating the transaction at the location remote from the transaction if the displayed image is an approved image.

* * * * *